(12) United States Patent
Kwon et al.

(10) Patent No.: US 12,311,834 B2
(45) Date of Patent: May 27, 2025

(54) LAMP FOR VEHICLE AND METHOD FOR CONTROLLING THE SAME

(71) Applicant: SL Corporation, Daegu (KR)

(72) Inventors: Tae Hong Kwon, Gyeongsan-si (KR); Chan Je Shin, Gyeongsan-si (KR)

(73) Assignee: SL Corporation, Daegu (KR)

( * ) Notice: Subject to any disclaimer, the term of this patent is extended or adjusted under 35 U.S.C. 154(b) by 153 days.

(21) Appl. No.: 18/308,300

(22) Filed: Apr. 27, 2023

(65) Prior Publication Data

US 2023/0365054 A1 Nov. 16, 2023

(30) Foreign Application Priority Data

May 13, 2022 (KR) .......................... 10-2022-0058988

(51) Int. Cl.
*B60Q 1/44* (2006.01)
*B60Q 1/34* (2006.01)
*F21S 43/00* (2018.01)

(52) U.S. Cl.
CPC .............. *B60Q 1/444* (2013.01); *B60Q 1/34* (2013.01); *F21S 43/00* (2018.01)

(58) Field of Classification Search
CPC ............ B60Q 1/444; B60Q 1/34; F21S 43/00
See application file for complete search history.

(56) References Cited

U.S. PATENT DOCUMENTS

| 6,087,777 | A | * | 7/2000 | Long | B60D 1/62 340/468 |
|---|---|---|---|---|---|
| 7,019,463 | B2 | * | 3/2006 | Kesterson | B60Q 1/20 340/468 |
| 9,796,326 | B2 | * | 10/2017 | Nordstrom | B60Q 1/381 |
| 11,326,756 | B1 | * | 5/2022 | Datz | B60Q 1/46 |
| 2008/0023273 | A1 | * | 1/2008 | Toelge | B60Q 1/448 701/79 |
| 2008/0055896 | A1 | * | 3/2008 | Feldmeier | F21V 23/0457 362/276 |
| 2014/0375448 | A1 | * | 12/2014 | Lee | B60Q 1/444 340/479 |
| 2015/0100213 | A1 | * | 4/2015 | Hu | B60Q 1/2607 701/70 |

(Continued)

FOREIGN PATENT DOCUMENTS

| CN | 111086447 | B | * | 1/2022 | ............. B60Q 1/441 |
|---|---|---|---|---|---|
| EP | 2186679 | A1 | * | 5/2010 | ............. B60Q 1/072 |

(Continued)

*Primary Examiner* — Chico A Foxx
(74) *Attorney, Agent, or Firm* — United One Law Group LLC; Kongsik Kim; Jhongwoo Peck

(57) ABSTRACT

A vehicle lamp may include a first light image forming unit configured to form a first light image, a second light image forming unit configured to form a second light image, and a controller configured to control the first light image forming unit and the second light image forming unit in response to an input operation command. In particular, the controller is configured to control the first light image forming unit to cause a luminous intensity of the first light image to be increased in response to a target operation command for a target operation of the second light image forming unit being input in a state in which the first light image forming unit forms the first light image.

10 Claims, 13 Drawing Sheets

(56) References Cited

U.S. PATENT DOCUMENTS

| | | | |
|---|---|---|---|
| 2015/0316227 A1* | 11/2015 | Sahlin | B60Q 1/0058 |
| | | | 362/511 |
| 2017/0028903 A1* | 2/2017 | Mochizuki | B60Q 11/00 |
| 2017/0184271 A1* | 6/2017 | Norris | F21S 43/20 |
| 2017/0190283 A1* | 7/2017 | Ding | B60T 17/22 |
| 2019/0162383 A1* | 5/2019 | Kim | F21S 43/249 |
| 2021/0180772 A1* | 6/2021 | Liu | B60Q 1/2603 |
| 2022/0169170 A1* | 6/2022 | Chen | F21S 43/14 |
| 2022/0186904 A1* | 6/2022 | Hasegawa | F21V 19/00 |
| 2022/0295623 A1* | 9/2022 | Inoue | B60Q 1/2607 |
| 2022/0363186 A1* | 11/2022 | Pampattiwar | B60Q 1/305 |
| 2023/0382289 A1* | 11/2023 | Watano | H04N 23/74 |

FOREIGN PATENT DOCUMENTS

| | | | | |
|---|---|---|---|---|
| EP | 3951256 A1 * | 2/2022 | | B60Q 1/22 |
| KR | 101258064 B1 * | 4/2013 | | |
| KR | 20200049265 A * | 5/2020 | | |
| WO | WO-2009093788 A1 * | 7/2009 | | B60Q 1/441 |

\* cited by examiner

LAMP FOR VEHICLE AND METHOD FOR CONTROLLING THE SAME

CROSS-REFERENCE TO RELATED APPLICATIONS

This application claims priority from Korean Patent Application No. 10-2022-0058988, filed on May 13, 2022, which is incorporated herein by reference in its entirety.

BACKGROUND

The present disclosure relates to a vehicle lamp and a method for controlling the vehicle lamp, and more particularly, to a vehicle lamp for enhancing a luminous intensity of a beam pattern formed by a brake lamp when the brake lamp and a turn signal lamp are simultaneously turned on, and a method for controlling the vehicle lamp.

A vehicle is equipped with one or more lamps that provide an illumination function for easily identifying objects located around the vehicle during low-light conditions (e.g., night-time driving) and a signaling function for notifying other vehicles or road users of the operating state of the vehicle.

For example, head lamps and fog lamps are primarily for the purpose of illumination functions, and turn signal lamps, tail lamps, brake lamps, side marker lamps, or the like, are for the purpose of signaling functions. The lamps are regulated for their installation standards and specifications to ensure that each functional requirement is fully met.

On the rear of the vehicle, turn signal lamps, tail lamps, and brake lamps may be provided. The brake lamps may turn on when a driver presses the brake pedal. The luminous intensity of the beam pattern formed by the brake lamp may be regulated. If the turn signal lamp is turned on simultaneously with the brake lamp, the luminous intensity of the beam pattern formed by the brake lamp may fail to satisfy the regulations.

Hence, it is required to increase the luminous intensity of the beam pattern formed by the brake lamp even when the brake lamp and the turn signal lamp are simultaneously turned on.

A typical example of a vehicle lamp is disclosed in Korean Utility Model Registration No. 20-0413486 (Apr. 3, 2006).

SUMMARY

The present disclosure provides a vehicle lamp for enhancing luminous intensity of a beam pattern formed by a brake lamp when the brake lamp and a turn signal lamp are simultaneously turned on, and a method for controlling the vehicle lamp.

Effects of the present disclosure other than those mentioned above will be clearly understood by those skilled in the art from the following description.

An aspect of the present disclosure may provide a vehicle lamp. The vehicle lamp according to an embodiment of the present disclosure may include a first light image forming unit configured to form a first light image, a second light image forming unit configured to form a second light image, and a controller configured to control the first light image forming unit and the second light image forming unit in response to an input operation command. The controller may be configured to control the first light image forming unit to cause a luminous intensity of the first light image to be increased when a target operation command for a target operation of the second light image forming unit is input in a state in which the first light image forming unit forms the first light image.

The first light image may include a first brake image, and the second light image may include a second brake image and a turn image. The first light image may further include a first tail image having a lower luminous intensity than the first brake image has, and the second light image may further include a second tail image having a lower luminous intensity than the second brake image has.

The controller may be further configured to control the first light image forming unit and the second light image forming unit to cause the first brake image and the second brake image to be formed in response to a brake operation command being input. The controller may be further configured to control the first light image forming unit and the second light image forming unit to cause the turn image to be formed instead of the second brake image and the luminous intensity of the first brake image to be increased, in response to the target operation command being input while the brake operation command is operative. The controller may be further configured to form the second brake image instead of the turn image and decrease the luminous intensity of the first brake image, in response to the input of the target operation command being released.

The first light image may include a first tail image, and the second light image may include a first partial image and a second partial image. The first partial image may include a first partial tail image, a first partial brake image, and a first turn image. The second partial image may include a second partial tail image, a second partial brake image, and a second turn image. The controller may be further configured to control the second light image forming unit to cause the first partial brake image and the second partial brake image to be formed in response to a brake operation command being input. The controller may be further configured to control the second light image forming unit to cause the second turn image to be formed instead of the second partial brake image and the luminous intensity of the first partial brake image to be increased, in response to the target operation command being input while the brake operation command is operative. The controller may be further configured to form the second partial brake image instead of the second turn image and decrease the luminous intensity of the first partial brake image, in response to the input of the target operation command being released.

An aspect of the present disclosure may provide a method for controlling a vehicle lamp, including a first light image forming unit configured to form a first light image and a second light image forming unit configured to form a second light image. The method according to an embodiment of the present disclosure may include receiving an operation command and in response controlling at least one of the first light image forming unit or the second light image forming unit, which may include controlling the first light image forming unit to cause a luminous intensity of the first light image to be increased in response to a target operation command for a target operation of the second light image forming unit being input in a state in which the first light image forming unit forms the first light image.

The first light image may include a first brake image, and the second light image may include a second brake image and a turn image. The controlling of at least one of the first light image forming unit or the second light image forming unit may further include controlling the first light image forming unit and the second light image forming unit to cause the first brake image and the second brake image to be formed in response to a brake operation command being input. The controlling of at least one of the first light image forming unit or the second light image forming unit may further include controlling the first light image forming unit and the second light image forming unit to cause the turn image to be formed instead of the second brake image and the luminous intensity of the first brake image to be increased, in response to the target operation command being input while the brake operation command is operative. The controlling of at least one of the first light image forming unit or the second light image forming unit may further include forming the second brake image instead of the turn image and reducing the luminous intensity of the first brake image, in response to the input of the target operation command being released.

The first light image may include a first tail image, the second light image may include a first partial image and a second partial image. The first partial image may include a first partial tail image, a first partial brake image, and a first turn image. The second partial image may include a second partial tail image, a second partial brake image, and a second turn image. The controlling of at least one of the first light image forming unit or the second light image forming unit may further include controlling the second light image forming unit to cause the first partial brake image and the second partial brake image to be formed in response to a brake operation command being input. The controlling of at least one of the first light image forming unit or the second light image forming unit may further include controlling the second light image forming unit to cause the second turn image to be formed instead of the second partial brake image and the luminous intensity of the first brake image to be increased, in response to the target operation command being input while the brake operation command is operative. The controlling of at least one of the first light image forming unit or the second light image forming unit may further include forming the second partial brake image instead of the second turn image and reducing the luminous intensity of the first partial brake image, in response to the input of the target operation command being released.

With the vehicle lamp and method of operating the same according to embodiments of the present disclosure, the luminous intensity of the beam pattern formed by the brake lamp may be increased when the brake lamp and the turn signal lamp are simultaneously operated, and thus, the luminous intensity of the beam pattern formed by the brake lamp may satisfy the luminous intensity requirements regardless of the turn signal operation.

Details of other embodiments are included in the detailed description and drawings.

DETAILED DESCRIPTION

Figure 1:
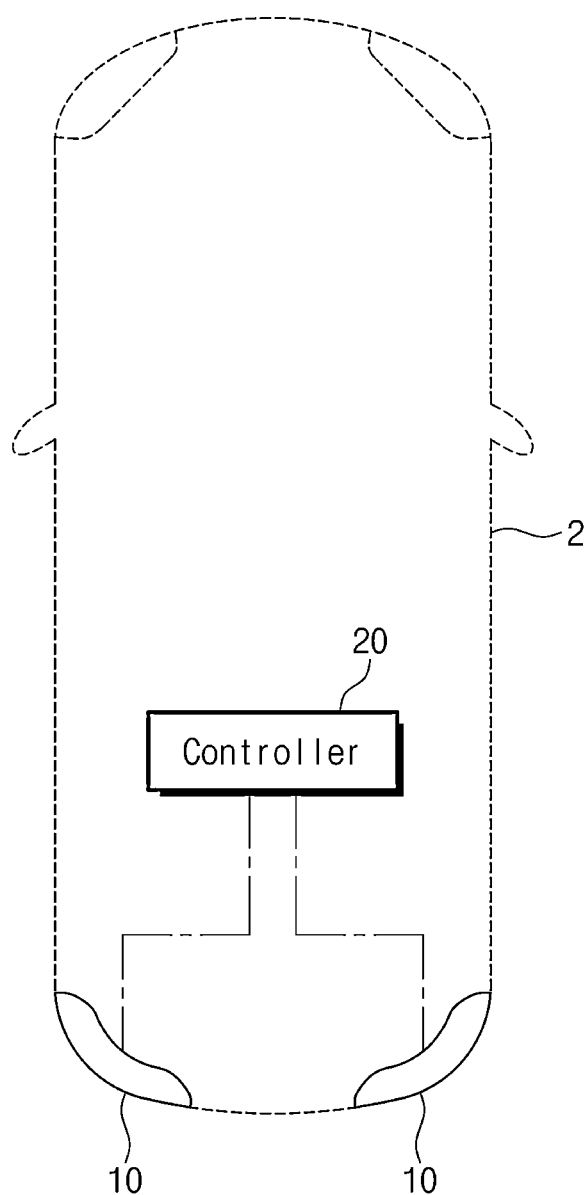
FIG. 1 illustrates a vehicle lamp according to an embodiment of the present disclosure.

Hereinafter, exemplary embodiments of the present disclosure will be described in detail with reference to the accompanying drawings. Advantages and features of the present disclosure, and methods of achieving them will be apparent with reference to the embodiments described below in detail together with the accompanying drawings. However, the present disclosure is not limited to the embodiments disclosed below, but may be implemented in a variety of forms. The embodiments are provided to complete the present disclosure, and to fully inform those of ordinary skill in the art to which this subject matter pertains. The present disclosure is merely defined by the scope of the claims. Like reference numerals refer to like elements throughout the specification.

Unless otherwise defined, all terms (including technical and scientific terms) used herein have the same meaning as commonly understood by one of ordinary skill in the art to which this subject matter pertains. Terms defined in common dictionaries should not be interpreted in an idealized or overly formal sense unless expressly so defined herein.

FIG. 1 illustrates a vehicle lamp according to an embodiment of the present disclosure. Referring to FIG. 1, a vehicle lamp 1 according to an embodiment of the present disclosure may include a light image forming unit 10 and a controller 20.

The light image forming unit 10 may be disposed at each of the left rear and right rear of a vehicle 2. The light image forming unit 10 may form a light image. In an embodiment of the present disclosure, the light image forming unit 10 may be disposed at the rear of the vehicle 2 to form at least one of a tail image, a brake image, or a turn image. Here, the tail image may be a light image for conveying the width of the vehicle 2 to an observer, the brake image may be a light image for conveying to the observer that the vehicle 2 is braking, and the turn image may be a light image for conveying to the observer that the vehicle 2 is turning or is about to turn.

The controller 20 may be configured to control the light image forming unit 10 in response to an input operation command. The light image forming unit 10 may include a first light image forming unit 100 (see FIG. 2) and a second light image forming unit 200 (see FIG. 2). The controller 20 may be configured to control the first light image forming unit 100 and the second light image forming unit 200 in response to the input operation command.

The controller 20 may be configured to control the first light image forming unit 100 and the second light image forming unit 200 to allow a tail image to be formed in response to a tail operation command being input. The controller 20 may be configured to control the first light image forming unit 100 and the second light image forming unit 200 to allow a brake image to be formed in response to a brake operation command being input. The controller 20 may be configured to control the first light image forming unit 100 and the second light image forming unit 200 to allow a turn image to be formed in response to a turn operation command being input.

Figure 2:
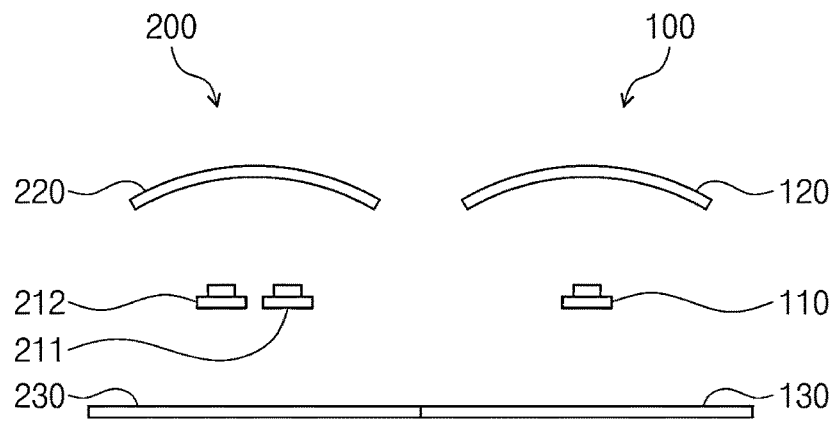
FIG. 2 illustrates a light image forming unit according to an embodiment of the present disclosure.

FIG. 2 illustrates the light image forming unit 10. Referring to FIG. 2, the light image forming unit 10 may include the first light image forming unit 100 and the second light image forming unit 200. The first light image forming unit 100 may form a first light image, and the second light image forming unit 200 may form a second light image.

As compared to the second light image forming unit 200, the first light image forming unit 100 may be disposed closer to an imaginary line connecting the front and rear centers of the vehicle 2. FIG. 2 shows that the first light image forming unit 100 may be disposed on the right side of the second light image forming unit 200, which means that the light image forming unit 10 shown in FIG. 2 may be disposed at the left rear of the vehicle 2.

The first light image forming unit 100 may include a light source 110, a reflector 120, and a lens 130. The second light image forming unit 200 may include light sources 211 and 212, a reflector 220, and a lens 230. The light sources 110, 211, and 212 may emit light, which the reflectors 120 and 220 may reflect to the lenses 130 and 230, which may transmit the incident light. Hereinafter, the light source 110, the reflector 120, and the lens 130, which are provided in the first light image forming unit 100, are referred to as a first light source 110, a first reflector 120, and a first lens 130, respectively. The light sources 211 and 212, the reflector 220, and the lens 230, which are provided in the second light image forming unit 200, are referred to as second light sources 211 and 212, a second reflector 220, and a second lens 230, respectively. The second light sources 211 and 212 may include a first operating light source 211 and a second operating light source 212.

The first light source 110, the first operating light source 211, and the second operating light source 212 may receive power while installed on a common board or on individual boards.

The light emitted from the first light source 110 may be used to form a tail image or a brake image. To this end, the first light source 110 may emit colorless (e.g., white) or red light. Hereinafter, the tail image and the brake image formed by light emitted from the first light source 110 are referred to as a first tail image and a first brake image, respectively.

When the first light source 110 emits red light, the first lens 130 may be formed of a colorless (e.g., clear) or red material. The first lens 130 of a colorless or red material may receive the red light from the first light source 110 and may allow the red light to exit. When the first light source 110 emits colorless light, the first lens 130 may be formed of a red material. The first lens 130 of a red material may receive the colorless light from the first light source 110 and may allow red light to exit.

Hereinafter, it is mainly described that the first light source 110 emits red light and the first lens 130 is made of a colorless material.

The first operating light source 211 and the second operating light source 212 may emit light of different colors. Light emitted from the first operating light source 211 may be used to form a tail image or a brake image, and light emitted from the second operating light source 212 may be used to form a turn image. To this end, the first operating light source 211 may emit colorless or red light, and the second operating light source 212 may emit yellow or amber light. Hereinafter, the tail image and the brake image formed by light emitted from the second light sources 211 and 212 are referred to as a second tail image and a second brake image, respectively.

When the first operating light source 211 emits red light, the second lens 230 may be formed of a colorless or red material. The second lens 230 of a colorless or red material may receive the red light from the first operating light source 211 and may allow the red light to exit. When the first operating light source 211 emits colorless light, the second lens 230 may be formed of a red material. The second lens 230 of a red material may receive the colorless light from the first operating light source 211 and may allow red light to exit.

When the second operating light source 212 emits amber light, the second lens 230 may be formed of a colorless material. The second lens 230 of a colorless material may receive the amber light from the second operating light source 212 and may allow the amber light to exit. When the second operating light source 212 emits yellow light, the second lens 230 may be formed of a red material. The second lens 230 of a red material may receive the yellow light from the second operating light source 212 and may allow amber light to exit.

Hereinafter, the first operating light source 211 and the second operating light source 212 emitting red light and amber light, respectively, and the second lens 230 made of a colorless material will be mainly described.

The controller 20 may be configured to control the first light image forming unit 100 and the second light image forming unit 200 to cause a first tail image and a second tail image to be formed in response to a tail operation command being input. In addition, the controller 20 may be configured to control the first light image forming unit 100 and the second light image forming unit 200 to cause a first brake image to be a second brake image to be formed in response to a brake operation command being input.

The controller 20 may be configured to control the first light image forming unit 100 to cause a luminous intensity of the first light image to be increased (e.g., augmented) in response to a target operation command for a target operation of the second light image forming unit 200 being input in a state in which the first light image forming unit 100 forms the first light image. Specifically, the controller 20 may be configured to control the first light image forming unit 100 and the second light image forming unit 200 to cause the turn image to be formed instead of the second brake image and the luminous intensity of the first brake image to be increased, in response to the target operation command being input while the brake operation command is operative. Here, the target operation command may be a turn operation command.

When the turn operation command is input, the second light image forming unit 200 may form the turn image instead of the second brake image. Since the second brake image is removed and the turn image is formed in the state in which the first brake image and the second brake image are formed, the overall luminous intensity of the brake image may be decreased. Accordingly, by the controller 20 enhancing the luminous intensity of the first brake image, the overall luminous intensity of the brake image may be maintained as similarly to the state where both the first brake image and the second brake image are formed.

The controller 20 may be configured to cause the second brake image to be formed instead of the turn image and the luminous intensity of the first brake image to be decreased to the luminous intensity before being increased, in response to the input of the target operation command being released. In other words, when the input of the turn operation command is released, the second light image forming unit 200 may form the second brake image instead of the turn image. In this case, the first brake image and the second brake image form the entire brake image, and thus the controller 20 may be configured to decrease the luminous intensity of the first brake image to the luminous intensity before being increased. Accordingly, the luminous intensity of the entire brake image may be maintained as similarly to the state where the first brake image and the turn image are formed.

Figure 3:
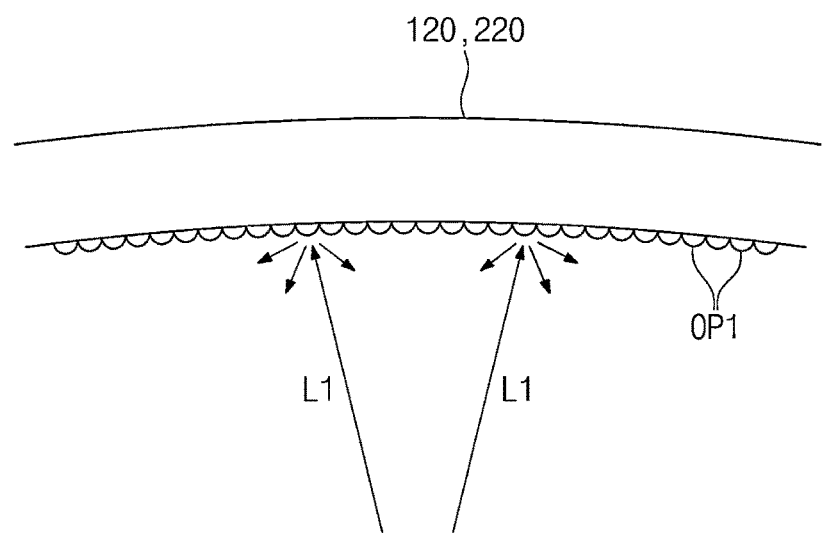
FIG. 3 is an enlarged view of a reflector according to an embodiment of the present disclosure.

FIG. 3 is an enlarged view of a reflector. Referring to FIG. 3, the reflectors 120 and 220 may each include diffuse reflectors OP1 that diffuse and reflect incident light L1.

The diffuse reflectors OP1 may protrude outwardly from the surfaces of the reflectors 120 and 220. The diffuse reflectors OP1 may be formed across the entire reflective surfaces of the reflectors 120 and 220. The light L1 irradiated from the light source 110, 211, or 212 may collide with the diffuse reflectors OP1 and be diffused in a plurality of directions. The light L1 irradiated from the light source 110, 211, or 212 may be diffused by the diffuse reflectors OP1 to enter the lenses 130 and/or 230. Thus, light having a substantially uniform luminous intensity may be transmitted across the entire area of the lenses 130 and 230.

Figure 4:
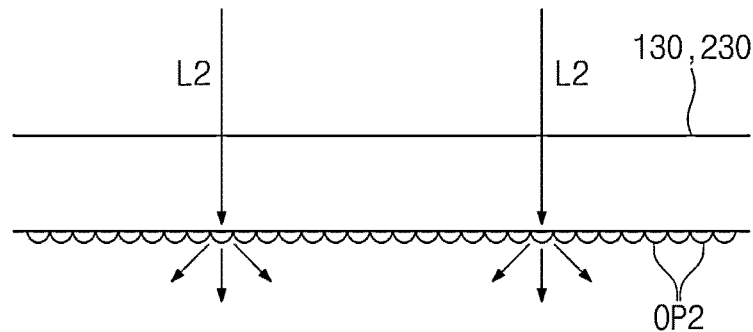
FIG. 4 is an enlarged view of a lens according to an embodiment of the present disclosure.

FIG. 4 is an enlarged view of a lens. Referring to FIG. 4, the lenses 130 and 230 may each include diffusing exit parts OP2 through which incident light L2 exits as diffused light.

The diffusing exit parts OP2 may protrude outwardly from the surfaces of the lenses 130 and 230. The diffusing exit parts OP2 may be formed across entire exiting surfaces of the lens 130 and 230. The light L2 reflected by the reflectors 120 and 220 may collide with the diffusing exit parts OP2 and may be diffused in a plurality of directions. Since the light L2 exits the diffusing exit parts OP2 as diffused light, a light image having a substantially uniform luminous intensity may be observed over the entire emitting surfaces of the lenses 130 and 230.

Figure 5:
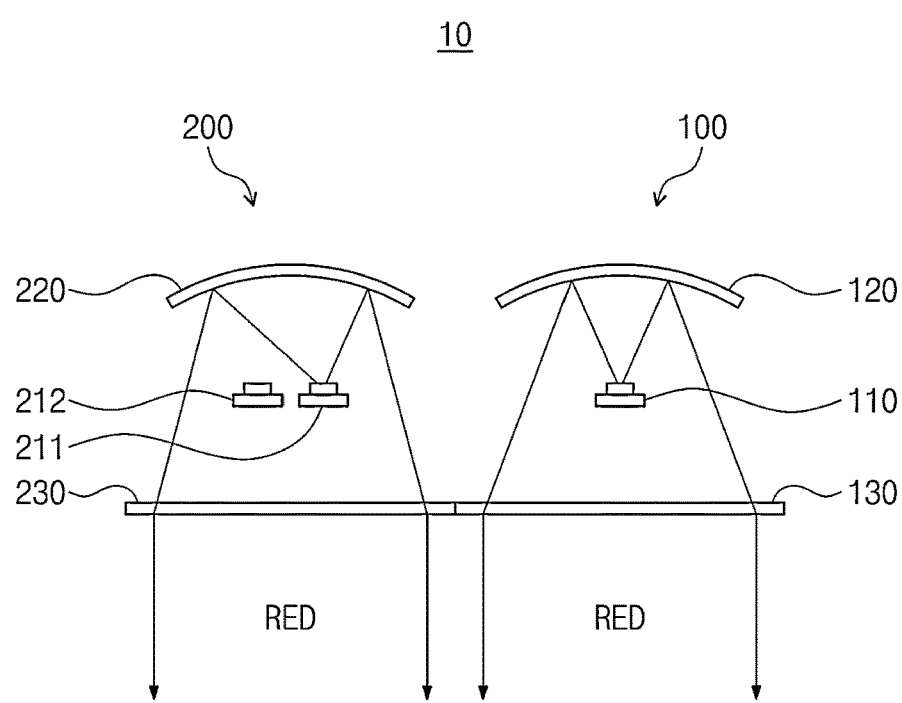
FIG. 5 describes a tail image or a brake image that is formed by a vehicle lamp according to an embodiment of the present disclosure.

FIG. 5 is a view for describing that a tail image or a brake image is formed by a vehicle lamp according to an embodiment of the present disclosure. Referring to FIG. 5, the vehicle lamp 1 may form a tail image or a brake image.

As the first light source 110 of the first light image forming unit 100 is turned on, a first light image may be formed. The first light image may include the first tail image and the first brake image. The first tail image may have a lower luminous intensity than the first brake image has.

As the first operating light source 211 of the second light image forming unit 200 is turned on, a second light image may be formed. The second light image may include the second tail image, the second brake image, and the turn image. When the first operating light source 211 is turned on, the second light image may include the second tail image and the second brake image. The second tail image may have a lower luminous intensity than the second brake image has.

When a tail operation command is input, the controller 20 may be configured to turn on the first light source 110 and the first operating light source 211 to cause the first tail image and the second tail image to be formed. When a brake operation command is input, the controller 20 may be configured to turn on the first light source 110 and the first operating light source 211 to cause the first brake image and the second brake image to be formed. When the brake operation command is input in a state in which the first tail image and the second tail image are formed, the controller 20 may be configured to increase the luminous intensity of light emitted by the first light source 110 and the first operating light source 211 to cause the first brake image and the second brake image to be formed.

Figure 6:
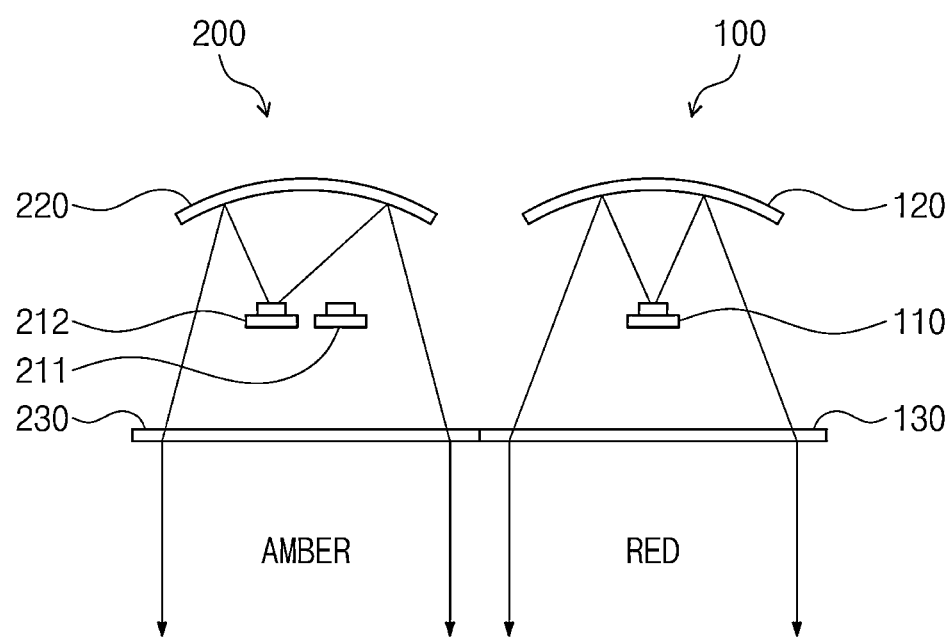
FIG. 6 describes a turn image that is formed by a vehicle lamp according to an embodiment of the present disclosure.

FIG. 6 illustrates a turn image formed by a vehicle lamp according to an embodiment of the present disclosure. Referring to FIG. 6, the vehicle lamp 1 may form a turn image.

When a turn operation command is input, the controller 20 may be configured to turn on the second operating light source 212 to cause the turn image to be formed. When the first operating light source 211 is turned on before a turn operation command is input, the controller 20 may be configured to turn off the first operating light source 211 while turning on the second operating light source 212.

When the turn image is formed, the first light image may be formed by the first light image forming unit 100. When the turn image is formed in a state in which the first light image is the first tail image, the controller 20 may be configured to maintain the luminous intensity of the first tail image. When the first light image is the first brake image, the controller 20 may be configured to control the first light image forming unit 100 to cause the luminous intensity of the first brake image to be increased.

Figure 7:
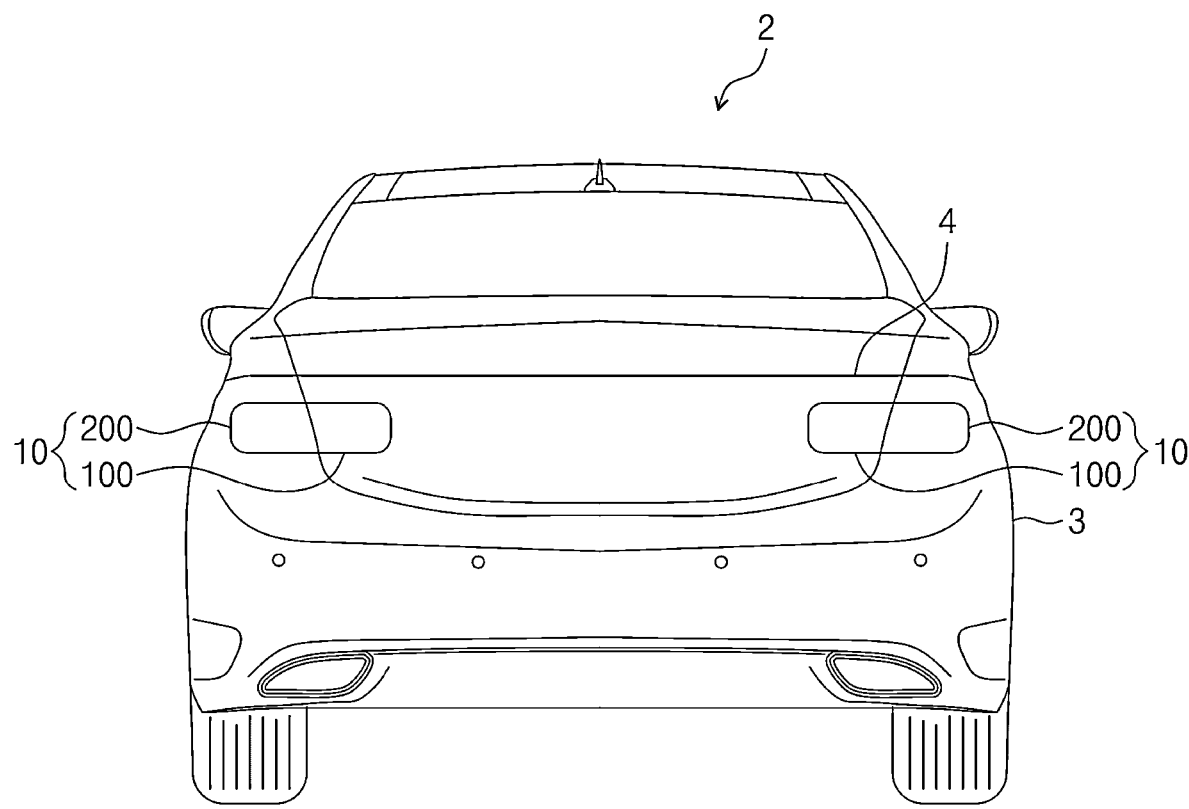
FIG. 7 illustrates the rear of a vehicle equipped with lamps according to an embodiment of the present disclosure.

FIG. 7 illustrates the rear of a vehicle equipped with vehicle lamps according to an embodiment of the present disclosure. Referring to FIG. 7, the light image forming unit 10 of the vehicle lamp 1 according to an embodiment of the present disclosure may be disposed at the rear of the vehicle 2.

The light image forming unit 10 may include the first light image forming unit 100 and the second light image forming unit 200. The rear of the vehicle 2 may include a vehicle body 3 and a trunk door 4. In some embodiments The first light image forming unit 100 may be disposed on the trunk door 4 and the second light image forming unit 200 may be disposed on the vehicle body 3. An observer may observe light images corresponding to the shapes of the first light image forming unit 100 and the second light image forming unit 200.

Figure 8:
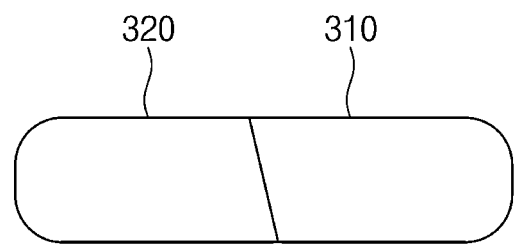
FIG. 8 illustrates image regions of a light image forming unit according to an embodiment of the present disclosure.
Figure 9:
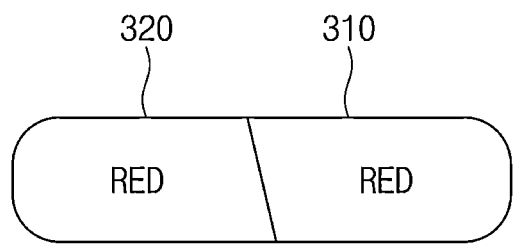
FIG. 9 illustrates a tail image or a brake image that is formed by a vehicle lamp according to an embodiment of the present disclosure.
Figure 10:
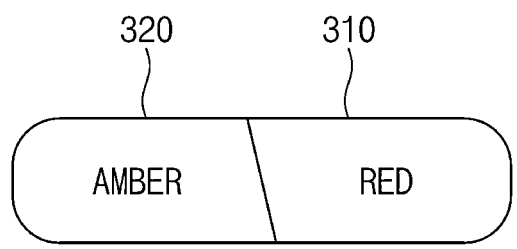
FIG. 10 illustrates a turn image that is formed by a vehicle lamp according to an embodiment of the present disclosure.

FIG. 8 illustrates image regions of the light image forming unit 10, FIG. 9 illustrates a tail image or a brake image that is formed, and FIG. 10 illustrates a turn image that is formed.

Referring to FIG. 8, the image regions of the light image forming unit 10 may include a first image region 310 and a second image region 320. The first image region 310 may correspond to the first light image forming unit 100, and the second image region 320 may correspond to the second light image forming unit 200. The first tail image or the first brake image may be formed with the first image region 310, and the second tail image, the second brake image, or the turn image may be formed with the second image region 320.

Referring to FIG. 9, the tail image or the brake image may be formed with the first image region 310 and the second image region 320. When a tail operation command is input, a red tail image may be formed with the first image region 310 and the second image region 320. When a brake operation command is input, a red brake image may be formed with the first image region 310 and the second image region 320. The brake image may have a higher luminous intensity than the tail image has.

Referring to FIG. 10, a turn image may be formed with the second image region 320. When a turn operation command is input, an amber turn image may be formed with the second image region 320. When the turn operation command is input while the tail operation command is effective, the first image region 310 may form the first tail image. When the turn operation command is input while the brake operation command is effective, the first image region 310 may form the first brake image. The controller 20 may be configured to increase the luminous intensity of the first brake image to be higher than the first tail image.

Figure 11:
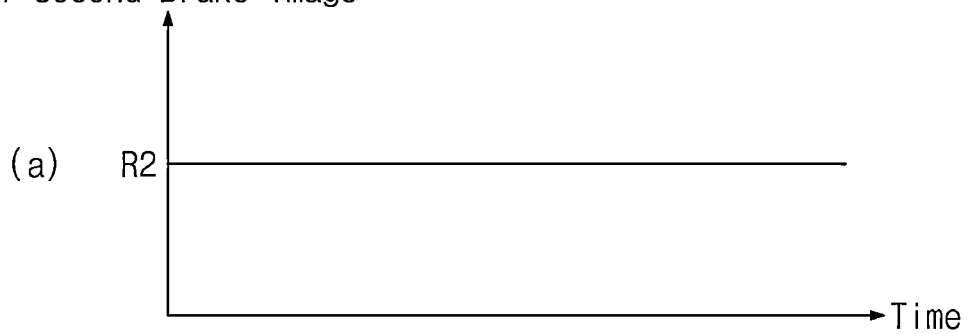
FIG. 11 are graphs illustrating luminous intensity of the first and second brake images.
Figure 11:
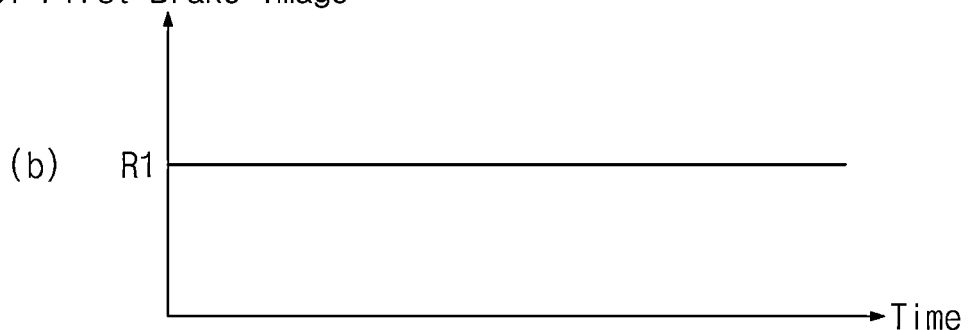
Figure 12:
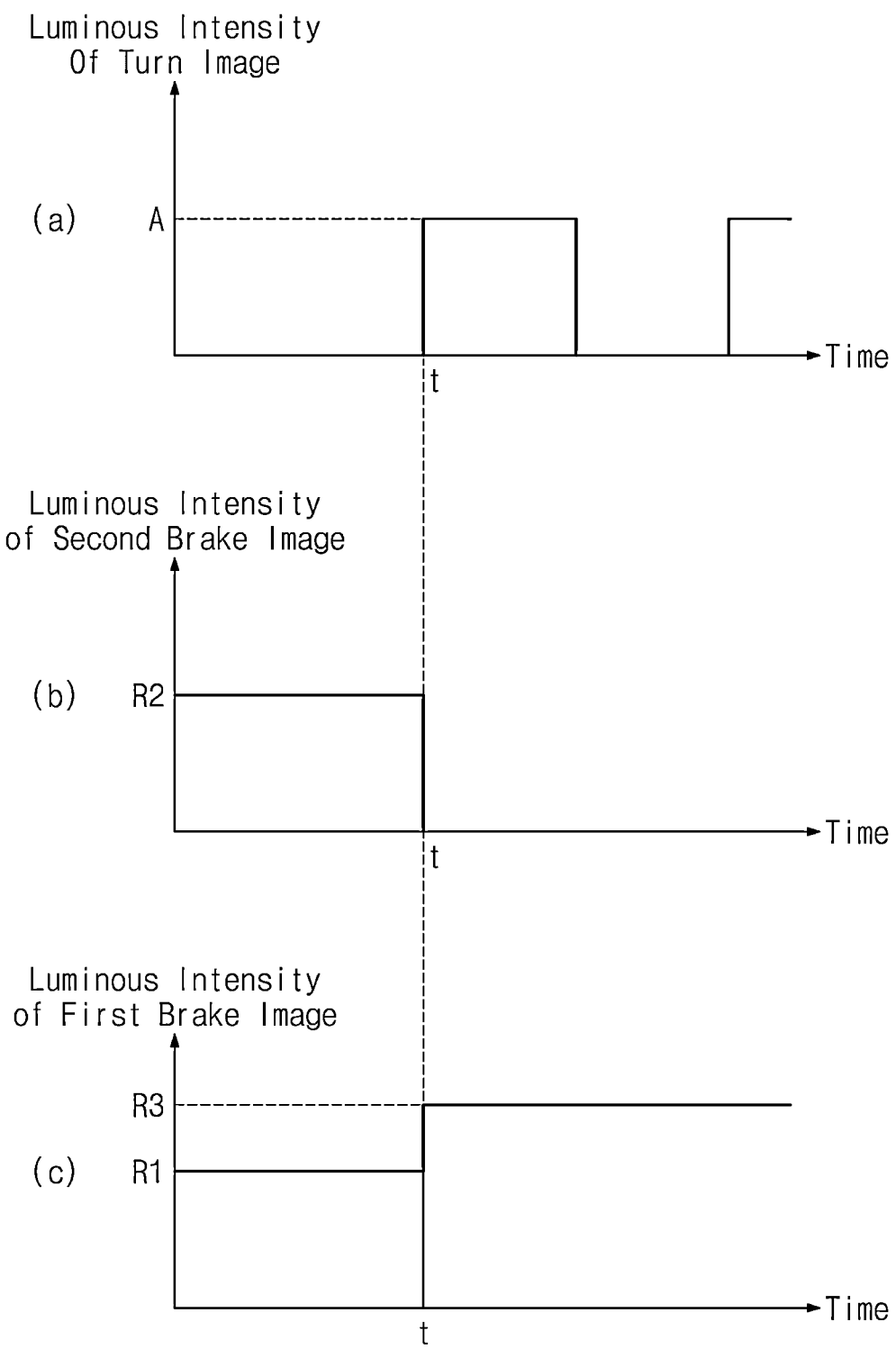
FIG. 12 are graphs illustrating change in luminous intensity of a brake image by input of a turn operation command.

FIG. 11 is a graph illustrating a luminous intensity of a brake image, and FIG. 12 is a graph illustrating a change in luminous intensity of a brake image by input of a turn operation command.

Referring to FIG. 11, when the brake operation command is input, the first light image forming unit 100 and the second light image forming unit 200 may form the first brake image and the second brake image, respectively. In FIG. 11, panel (a) represents the luminous intensity of the second brake image formed by the second light image forming unit 200, and panel (b) represents the luminous intensity of the first brake image formed by the first light image forming unit 100.

As shown in FIG. 11, when the brake operation command is input, the first light image forming unit 100 and the second light image forming unit 200 may form the first brake image and the second brake image with mutually independent luminous intensities. In other words, the first light image forming unit 100 may form the first brake image with a luminous intensity of R1, and the second light image forming unit 200 may form the second brake image with a luminous intensity of R2. Here, R1 and R2 may be equal to or different from each other.

Referring to FIG. 12, when the turn operation command is input while the brake operation command is being input, the controller 20 may be configured to control the first light image forming unit 100 and the second light image forming unit 200 to allow the turn image to be formed together with the brake image. In FIG. 12, panel (a) represents the luminous intensity of the turn image formed by the second light image forming unit 200, and panel (b) represents the luminous intensity of the second brake image formed by the second light image forming unit 200, and panel (c) represents the luminous intensity of the first brake image formed by the first light image forming unit 100.

As shown in FIG. 12, when the turn operation command is input at time t, the controller 20 may be configured to stop the formation of the second brake image to allow the turn image to be formed. The turn image may be formed while the second operating light source 212 of the second light image forming unit 200 blinks. When the second operating light source 212 is turned on, the turn image having a luminous intensity of A may be formed. During this period, the controller 20 may be configured to increase the luminous intensity of the first brake image from R1 to R3. The difference between R1 and R3 may be predetermined to allow the requirements to be satisfied solely with the luminous intensity of the first brake image.

Figure 13:
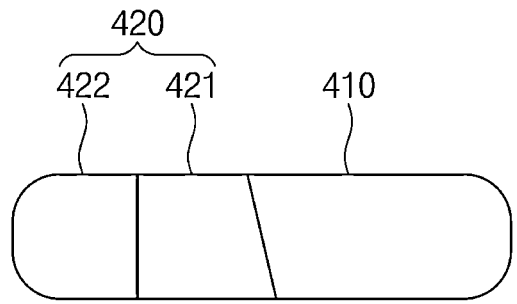
FIG. 13 illustrates image regions of a vehicle lamp according to an embodiment of the present disclosure.
Figure 14:
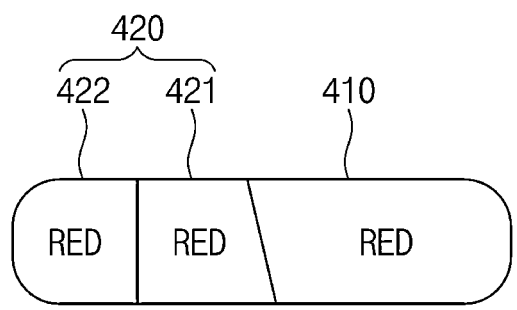
FIG. 14 illustrates a tail image or a brake image formed with the image regions of FIG. 13.
Figure 15:
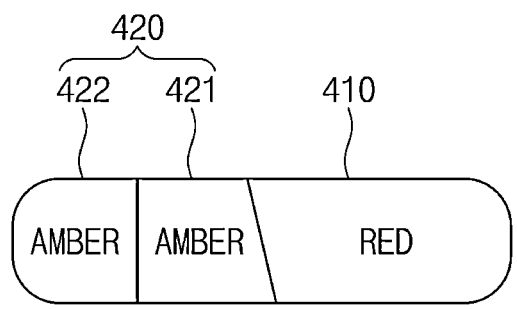
FIG. 15 illustrates a turn image formed with the image regions of FIG. 13.
Figure 16:
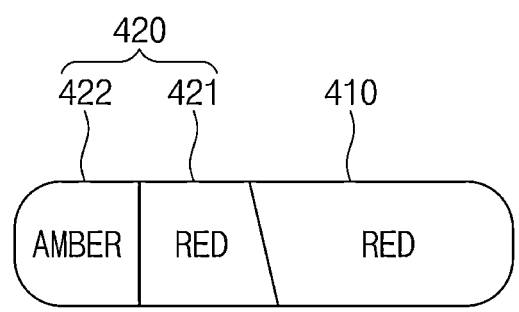
FIG. 16 illustrates a tail image or a brake image formed with the image regions of FIG. 13.
Figure 17:
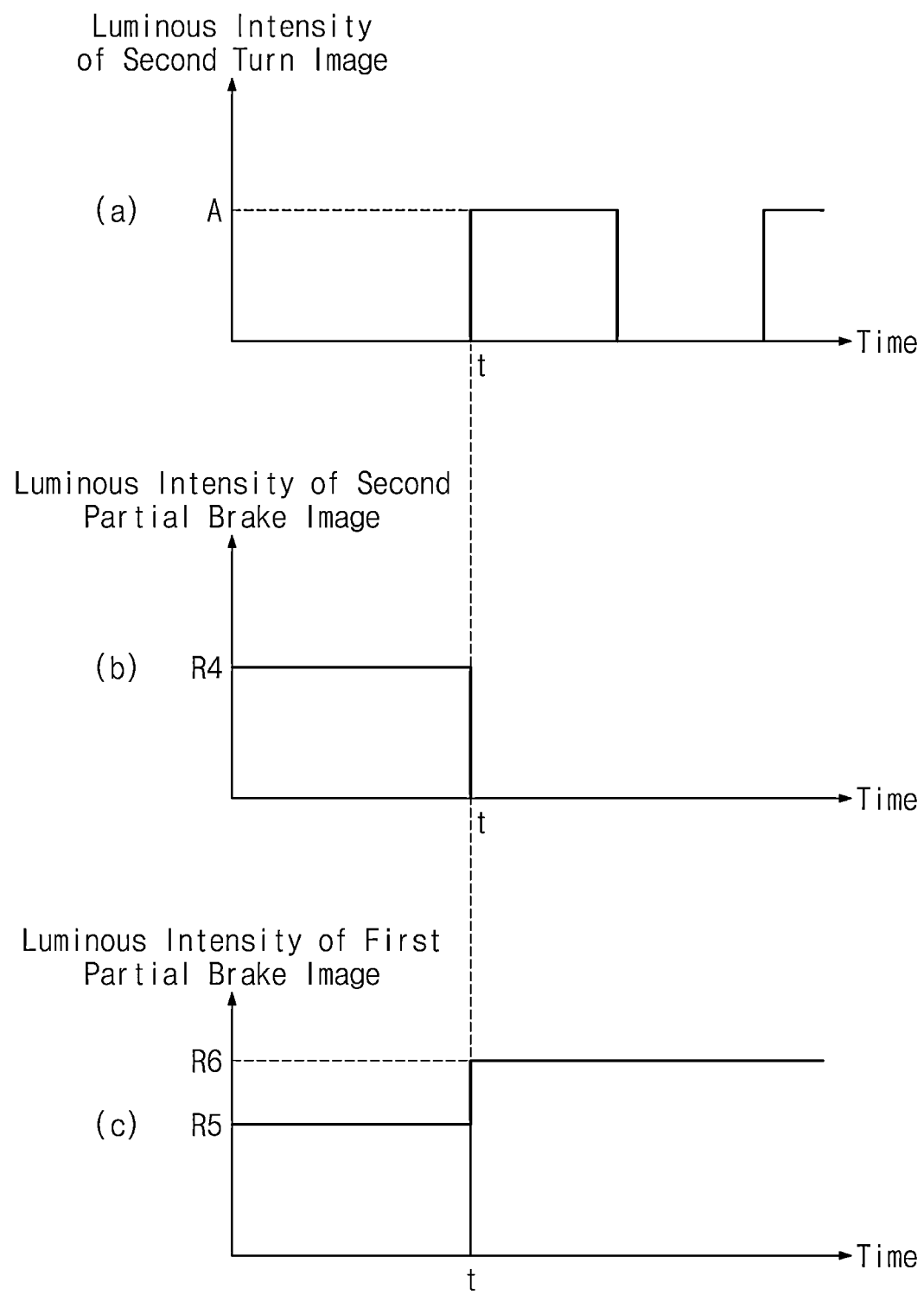
FIG. 17 are graphs illustrating change in luminous intensity of a brake image with input of a turn operation command.

FIG. 13 illustrates image regions of a vehicle lamp according to another embodiment of the present disclosure, FIG. 14 illustrates a tail image or a brake image that is formed with the image regions of FIG. 13, FIG. 15 illustrates a turn image that is formed with the image regions of FIG. 13, and FIG. 16 illustrates the tail image or the brake image that is formed with the image regions of FIG. 13. FIG. 17 is a graph representing change in luminous intensity of a brake image with input of a turn operation command.

Referring to FIG. 13, image regions of the light image forming unit 10 according to an embodiment of the present disclosure may include a first image region 410 and a second image region 420.

The first image region 410 may correspond to the first light image forming unit 100, and the second image region 420 may correspond to the second light image forming unit 200. Further, the second image region 420 may include a first partial region 421 and a second partial region 422.

The second light image forming unit 200 may include a first operating light source, a second operating light source, a third operating light source, and a fourth operating light source. The first operating light source and the second operating light source may emit light to the first partial region 421, and the third operating light source and the fourth operating light source may emit light to the second partial region 422. For example, the first operating light source may emit red light to the first partial region 421, the second operating light source may emit amber light to the first partial region 421, the third operating light source may emit red light to the second partial region 422, and the fourth operating light source may emit amber light to the second partial region 422.

Light beams from the first operating light source and the second operating light source may be prevented from entering the second partial region 422, and light beams from the third operating light source and the fourth operating light source may be prevented from entering the first partial region 421. Accordingly, the light image of the first partial region 421 and the light image of the second partial region 422 may be separately observed.

According to an embodiment of the present disclosure, the first light image may include a first tail image. The second light image may include a first partial image and a second partial image. The first partial image may include a first partial tail image, a first partial brake image, and a first turn image. The second partial image may include a second partial tail image, a second partial brake image, and a second turn image.

The first tail image may be formed with the first image region 410. The first partial tail image, the first partial brake image, or the first turn image may be formed with the first partial region 421. The second partial tail image, the second partial brake image, or the second turn image may be formed with the second partial region 422.

Referring to FIG. 14, the tail image or the brake image may be formed with the first image region 410, the first partial region 421, and the second partial region 422.

When a tail operation command is input, a red tail image may be formed with the first image region 410, the first partial region 421, and the second partial region 422. The controller 20 may be configured to control the first light image forming unit 100 and the second light image forming unit 200 to cause the first tail image, the first partial tail image, and the second partial tail image to be formed in response to the tail operation command being input.

When a brake operation command is input, a red brake image may be formed with the first partial region 421 and the second partial region 422. The controller 20 may be configured to control the second light image forming unit 200 to cause the first partial brake image and a second partial brake image to be formed in response to the brake operation command being input. The first partial brake image and the second partial brake image may have a higher luminous intensity than the first partial tail image and the second partial tail image have. For example, both the first partial brake image and the second partial brake image may have a higher luminous intensity than each of the first partial tail image and the second partial tail image has.

Referring to FIG. 15, a turn image may be formed with the first partial region 421 and the second partial region 422.

When a turn operation command is input in a state in which the tail operation command is effective (e.g., active or activated), an amber turn image may be formed with the first partial region 421 and the second partial region 422. More specifically, the first turn image may be formed with the first partial region 421 and the second turn image may be formed with the second partial region 422. At this time, the first image region 410 may maintain the formed first tail image.

The controller 20 may be configured to control the second light image forming unit 200 to cause the first partial tail image and the second partial tail image to be changed to the first turn image and the second turn image when the turn operation command is input while the tail operation command is effective.

Referring to FIG. 16, the first partial brake image and the second turn image may be formed with the first partial region 421 and the second partial region 422.

When the turn operation command is input in the state in which the brake operation command is effective, a red first partial brake image may be formed with the first partial region 421, and an amber second partial brake image may be formed with the second partial region 422. At this time, the first image region 410 may maintain the formed first tail image.

The controller 20 may be configured to control the second light image forming unit 200 to cause the second turn image to be formed instead of the second partial brake image and the luminous intensity of the first partial brake image to be increased in response to a target operation command, that is, the turn operation command, being input while the brake operation command is operative.

The controller 20 may be configured to cause the second partial brake image to be formed instead of the second turn image and the luminous intensity of the first partial brake image to be decreased to the luminous intensity before being increased, in response to the input of the target operation command (e.g., the turn operation command) being released.

Referring to FIG. 17, when a turn operation command is input at a point in time t, the controller 20 may be configured to release the formation of the second partial brake image to allow the second turn image to be formed. In FIG. 17, panel (a) represents the luminous intensity of the second turn image formed by the second light image forming unit 200, panel (b) represents the luminous intensity of the second partial brake image formed by the second light image forming unit 200, and panel (c) represents the luminous intensity of the first partial brake image formed by the second light image forming unit 200.

When the turn operation command is input in the state in which the brake operation command is effective, the second partial brake image may be removed and the second turn image may be formed. At this time, the controller 20 may be configured to increase the luminous intensity of the first partial brake image from R5 to R6. The difference between R5 and R6 may be predetermined to be capable of satisfying the luminous intensity requirements solely with the first partial brake image.

Figure 18:
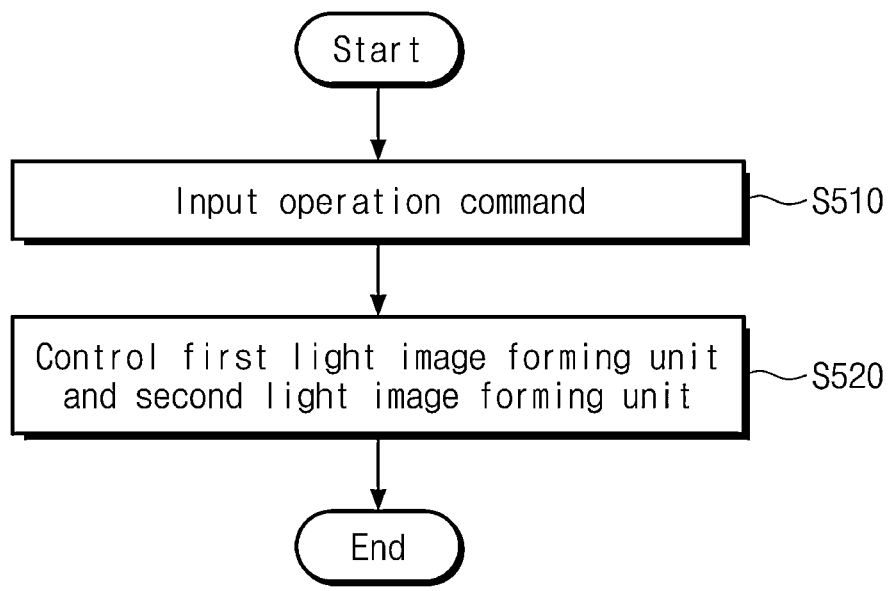
FIG. 18 is a flowchart illustrating a method for controlling a vehicle lamp according to an embodiment of the present disclosure.
Figure 19:
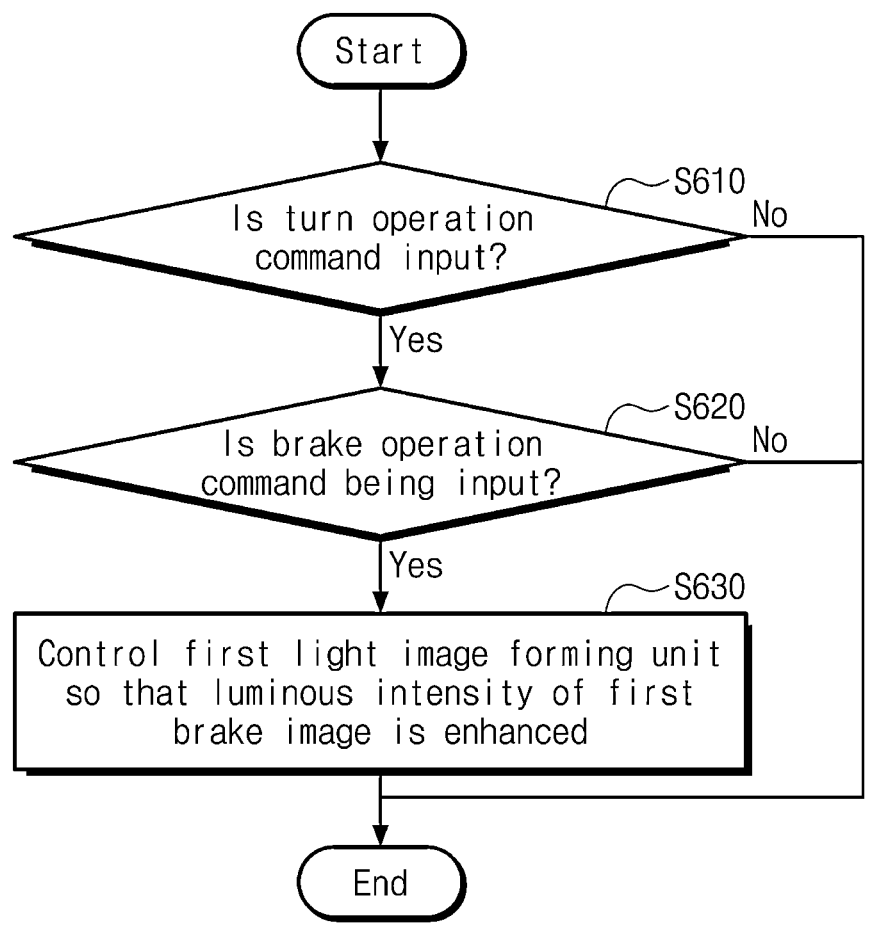
FIG. 19 is a flowchart illustrating change in luminous intensity of a brake image by input of a turn operation command.

FIG. 18 is a flowchart illustrating a method for controlling a vehicle lamp according to an embodiment of the present disclosure, and FIG. 19 is a flowchart illustrating change in luminous intensity of a brake image due to input of a turn operation command.

Referring to FIG. 18, the controller 20 may be configured to control the first light image forming unit 100 and the second light image forming unit 200 in response to operation commands.

First, the controller 20 may be configured to receive an input operation command (S510). The operation command may include a tail operation command, a brake operation command, or a turn operation command. The operation command may be manually input by a user (e.g., driver) or automatically generated by the vehicle 2.

As the operation command is input, the controller 20 may be configured to control the first light image forming unit 100 and the second light image forming unit 200 in response to the operation command (S520). The controller 20 may be configured to control the first light image forming unit 100 and the second light image forming unit 200 to allow a tail image to be formed in response to the tail operation command being input, a brake image to be formed in response to the brake operation command being input, and a turn image to be formed in response to the turn operation command being input.

Referring to FIG. 19, the controller 20 may be configured to control the first light image forming unit 100 and the second light image forming unit 200 depending on whether the brake operation command and the turn operation command are concurrently operative.

First, the controller 20 may be configured to determine whether the turn operation command is input (S610). When the turn operation command is effective, the controller 20 may be configured to determine whether the brake operation command is being input (S620). When the brake operation command is being input while the turn operation command is effective, the controller 20 may be configured to control the first light image forming unit 100 to allow the luminous intensity of the first brake image to be increased while controlling the second light image forming unit 200 to form the turn image (S630). Even if the second brake image is removed and the turn image is formed by the second light image forming unit 200, since the luminous intensity of the first brake image is increased, the overall luminous intensity of the brake image may be maintained as similarly to the state where both the first brake image and the second brake image are formed.

As described above, the luminous intensity of the beam pattern formed by the brake lamp may be increased when the brake lamp and the turn signal lamp are simultaneously operated, and thus, the luminous intensity of the beam pattern formed by the brake lamp may satisfy the luminous intensity requirements regardless of the turn signal operation.

Exemplary embodiments of the present disclosure have been described with reference to the above and the accompanying drawings. Those of ordinary skill in the art to which this subject matter pertains should understand that additional or alternative embodiments may preserve the technical spirit or essential features of the present disclosure. Therefore, it is to be appreciated that the embodiments described above are intended to be illustrative in all respects and not restrictive.

What is claimed is:

1. A vehicle lamp, comprising:
a first light image forming unit configured to form a first light image;
a second light image forming unit configured to form a second light image; and
a controller configured to control the first light image forming unit and the second light image forming unit in response to an input operation command,
wherein the controller is configured to control the first light image forming unit to cause a luminous intensity of the first light image to be increased when a target operation command for a target operation of the second light image forming unit is input in a state in which the first light image forming unit forms the first light image,
wherein the first light image includes a first brake image,
wherein the second light image includes a second brake image and a turn image, and
wherein the controller is further configured to control the first light image forming unit and the second light image forming unit to:
cause the first brake image and the second brake image to be formed in response to a brake operation command being input; and
cause the turn image to be formed instead of the second brake image and the luminous intensity of the first brake image to be increased in response to the target operation command being input while the brake operation command is operative.

2. The vehicle lamp of claim 1, wherein the first light image further includes a first tail image having a lower luminous intensity than the first brake image has, and
wherein the second light image further includes a second tail image having a lower luminous intensity than the second brake image has.

3. The vehicle lamp of claim 1, wherein the controller is further configured to form the second brake image instead of the turn image and decrease the luminous intensity of the first brake image, in response to the input of the target operation command being released.

4. A vehicle lamp, comprising:
a first light image forming unit configured to form a first light image;
a second light image forming unit configured to form a second light image; and
a controller configured to control the first light image forming unit and the second light image forming unit in response to an input operation command,
wherein the controller is configured to control the first light image forming unit to cause a luminous intensity of the first light image to be increased when a target operation command for a target operation of the second light image forming unit is input in a state in which the first light image forming unit forms the first light image,
wherein the first light image includes a first tail image,
wherein the second light image includes a first partial image and a second partial image,
wherein the first partial image includes a first partial tail image, a first partial brake image, and a first turn image,
wherein the second partial image includes a second partial tail image, a second partial brake image, and a second turn image, and
wherein the controller is further configured to control the second light image forming unit to:
cause the first partial brake image and the second partial brake image to be formed in response to a brake operation command being input; and
cause the second turn image to be formed instead of the second partial brake image and the luminous intensity of the first partial brake image to be increased in response to the target operation command being input while the brake operation command is operative.

5. The vehicle lamp of claim 4, wherein the controller is further configured to form the second partial brake image instead of the second turn image and decrease the luminous intensity of the first partial brake image in response to the input of the target operation command being released.

6. The vehicle lamp of claim 4, wherein the first light image further includes a first tail image having a lower luminous intensity than the first brake image has, and
wherein the second light image further includes a second tail image having a lower luminous intensity than the second brake image has.

7. A method for controlling a vehicle lamp including a first light image forming unit configured to form a first light image and a second light image forming unit configured to form a second light image, the method comprising:
receiving an operation command; and
controlling at least one of the first light image forming unit or the second light image forming unit in response to the operation command,
wherein the controlling of at least one of the first light image forming unit or the second light image forming unit includes controlling the first light image forming unit to cause a luminous intensity of the first light image to be increased in response to a target operation command for a target operation of the second light image forming unit being input in a state in which the first light image forming unit forms the first light image,
wherein the first light image includes a first brake image,
wherein the second light image includes a second brake image and a turn image, and
wherein the controlling of at least one of the first light image forming unit or the second light image forming unit further includes controlling the first light image forming unit and the second light image forming unit to:
cause the first brake image and the second brake image to be formed in response to a brake operation command being input; and
cause the turn image to be formed instead of the second brake image and the luminous intensity of the first brake image to be increased in response to the target operation command being input while the brake operation command is operative.

8. The method of claim 7, wherein the controlling of at least one of the first light image forming unit or the second light image forming unit further includes forming the second brake image instead of the turn image and decreasing the luminous intensity of the first brake image in response to the input of the target operation command being released.

9. A method for controlling a vehicle lamp including a first light image forming unit configured to form a first light image and a second light image forming unit configured to form a second light image, the method comprising:
  receiving an operation command; and
  controlling at least one of the first light image forming unit or the second light image forming unit in response to the operation command,
  wherein the controlling of at least one of the first light image forming unit or the second light image forming unit includes controlling the first light image forming unit to cause a luminous intensity of the first light image to be increased in response to a target operation command for a target operation of the second light image forming unit being input in a state in which the first light image forming unit forms the first light image,
  wherein the first light image includes a first tail image,
  wherein the second light image includes a first partial image and a second partial image,
  wherein the first partial image includes a first partial tail image, a first partial brake image, and a first turn image,
  wherein the second partial image includes a second partial tail image, a second partial brake image, and a second turn image, and
  wherein the controlling of at least one of the first light image forming unit or the second light image forming unit further includes controlling the second light image forming unit to:
    cause the first partial brake image and the second partial brake image to be formed in response to a brake operation command being input; and
    cause the second turn image to be formed instead of the second partial brake image and the luminous intensity of the first brake image to be increased in response to the target operation command being input while the brake operation command is operative.

10. The method of claim 9, wherein the controlling of at least one of the first light image forming unit or the second light image forming unit further includes forming the second partial brake image instead of the second turn image and decreasing the luminous intensity of the first partial brake image in response to the input of the target operation command being released.

* * * * *